May 23, 1972  T. R. PRYOR  3,664,739
METHOD AND DEVICE FOR MEASURING STRAIN AND
OTHER CHANGES IN DIMENSION
Filed Aug. 9, 1968  3 Sheets-Sheet 1

INVENTOR
TIMOTHY R. PRYOR

BY Sarsey and Taylor
ATTORNEYS

May 23, 1972

T. R. PRYOR 3,664,739

METHOD AND DEVICE FOR MEASURING STRAIN AND
OTHER CHANGES IN DIMENSION

Filed Aug. 9, 1968

*INVENTOR.*
TIMOTHY R. PRYOR

United States Patent Office 3,664,739
Patented May 23, 1972

3,664,739
METHOD AND DEVICE FOR MEASURING STRAIN AND OTHER CHANGES IN DIMENSION
Timothy R. Pryor, 5423 York Lane,
Bethesda, Md. 20014
Filed Aug. 9, 1968, Ser. No. 751,615
Int. Cl. G02f 1/30
U.S. Cl. 356—32
8 Claims

ABSTRACT OF THE DISCLOSURE

The separation of two points, each located on a member and being separated by an aperture, is measured by directing waves, such as light waves, on the points to form a diffraction pattern of the single aperture type. A change in dimension of the member, or in the spacing between two adjacent members, causes the separation of the edges to change which, in turn, causes a change in the configuration of the pattern. By comparing the intensity of a given portion of the pattern with a portion of a pattern produced under known conditions, a change in the separation of the points can be determined from which measurement of dimension, strain, etc., can be determined.

BACKGROUND OF THE INVENTION

This invention relates to a method and apparatus for detecting the spacial relationship between points each on a member. In one aspect the invention relates to a method and apparatus for detecting the magnitude of the separation of points each on edges of a member. In another aspect the invention relates to a method and apparatus for detecting changes in the separation of such points or changes in the separation of said points relative to a standard separation. In a further aspect, the invention relates to a method and apparatus for the determination of quantities such as strain, temperature, etc. which are related to changes in the linear separation of such points, and which may be derived therefrom.

Devices and methods of the foregoing general type are disclosed in Bell, U.S. Pat. No. 2,929,242 and in my co-pending U.S. Pat. application Ser. No. 402,449 now Pat. No. 3,458,257. As shown in the Bell patent, strain in a member is determined by providing a member with a finely ruled diffraction grating and determining strain from changes in the separation of the lines by determining, by means of an intensity measurement, changes in an angle of a diffracted order of light. A uniform light field is focussed on the grating and the angle of a diffracted order is determined by measuring the intensity of light passing through a "V" slit. The bell device, however, is large, complex, and requires extremely fine gratings which are difficult to apply under non-laboratory conditions. Furthermore, changes in source intensity, detector sensitivity, grating reflectivity and background light conditions render long term measurements of strain difficult, if not impossible.

The method and device disclosed in my co-pending application Ser. No. 402,449 overcomes several of the disadvantages of the Bell invention. The improved device employs a light source which emits "light" having a wavelength of at least 6,000 A., for example 85,000 A., and utilizes a much coarser diffraction grating having a spacing of not more than 4,000 lines per inch, for example 1,000 lines per inch. In order to render long term strain measurements feasible, my device includes a detector array to directly read the angle of an order of diffracted light, thus eliminating the need for corrections to account for changes in source intensity, etc. The device can read a high order of diffracted light and can be quite compact.

BRIEF SUMMARY OF THE INVENTION

According to the present invention, the need for utilizing a diffraction grating in a method and device of the foregoing type has been obviated. Instead, the present invention relies upon diffraction of the single aperture type which requires only two edges upon which waves are impinged. The waves, which may be sound waves or electromagnetic radiation waves, are diffracted by being impinged at two points each on an edge of a member. The edges may be provided on a member by providing a depression or raised portion on a surface of the member, or by providing adjacent areas of sharply differing reflectivity. In the last instance, the edges constitute the line of demarcation between adjacent areas of differing reflectivity and this condition may also exist where the edges are provided by a depression or a raised portion on the member. Alternately, spaced adjacent edges of two separate members may be used. To determine the separation of two points for strain measurement purposes, the edges are provided on the member, for example by simply scratching a steel member with a sharp blade. Waves are directed from a source towards two points on the edges of the scratch to produce a diffraction pattern of the single aperture type which pattern is symmetrical about an axis of symmetry. The intensity of a portion of the pattern a known certain distance from the axis of symmetry is then measured. At a later time, for example after the member has been subjected to an unknown strain, the intensity of a portion of the pattern a known distance from the axis of symmetry is measured. The distance can be selected to be identical to the first distance in which case any detected change in intensity can be equated to a change in the separation of the edges by known relationships. Alternatively, the distance in each case can be selected to occur at any given minimum or secondary maxima in which case the angular change in the position thereof can be equated to a change in the separation of the edges by known relationships. In either case, the first intensity measurement can be applied to a known standard and the second measurement made under identical conditions except that the spacing of the edges is unknown, in which case the spacing is derived by a comparison with the measurement of the intensity of the standard diffraction pattern. In any event, by comparing the intensity of a portion of the diffraction patterns produced, any differences in separation of the two points or edges can be determined.

DETAILED DESCRIPTION OF THE INVENTION

Figure 1:
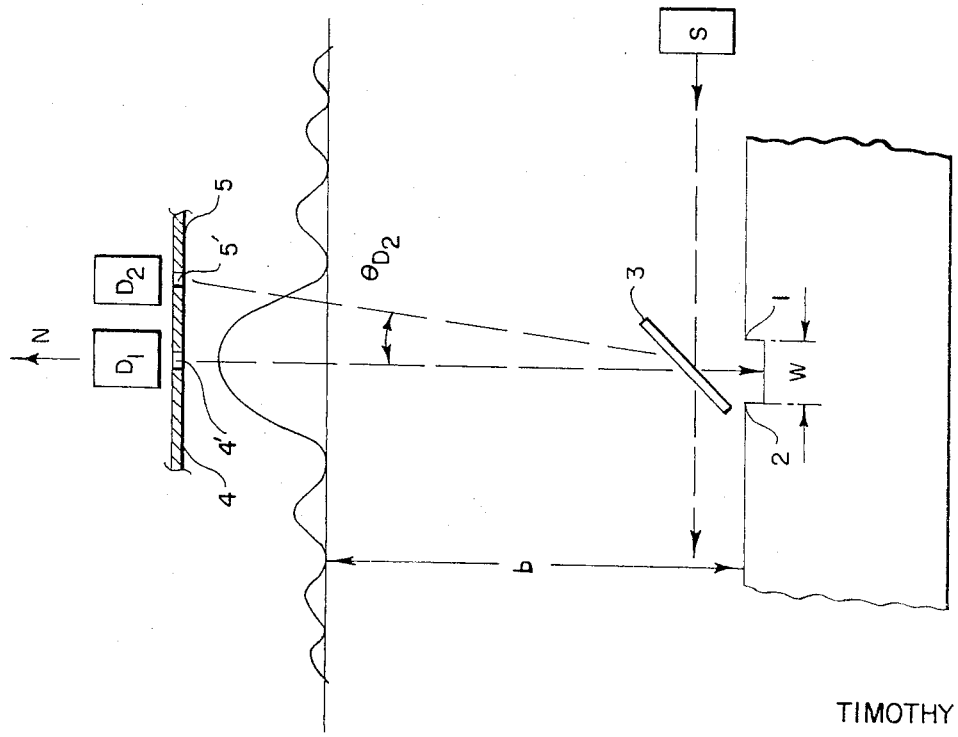
FIG. 1 is a diagrammatic view of an embodiment of the invention.

As shown in FIG. 1, the surface of a specimen, in this case a steel member, is provided with a groove having a width W, and having points 1 and 2 on the groove edges. The groove is provided by scribing the specimen with a sharp tool and, in this case, was 0.5 mm. in width. A wave source S, in this case a gallium arsenide diode laser operating at $0.85\mu$ is located to direct its waves, in this case plane waves having a wavelength $\lambda$, normal to the specimen surface. A beam splitter 3 is used to cause the incident radiation to impinge normal to the specimen surface and the light is diffracted at the edges of the groove. The beam splitter is a partially reflecting multilayer dielectric-coated mirror. The groove has a high reflectance relative to the specimen surface. Accordingly, in a plane a distance $b$ from the point 1 and 2 on the groove edges there will be observed a diffraction pattern of the single aperture type which, for values of $b \gg W$, will be a Fraunhofer pattern as illustrated. The Fraunhofer pattern is a symmetrical pattern which shows several secondary maxima and minima lying on each side of an intense principal maximum centered about an axis of symmetry N which in this case is perpendicular to the specimen surface. A first wave detector $D_1$, in this case a silicon photodiode having an active area of 0.11 in.$^2$; rise time $10^{-9}$ sec.; operating in the photoconductive regime with a 1–10 volt bias, is positioned or capable of being positioned to detect the central maximum. The detectors are located a distance $b$ from the groove edges. A moveable mask 4 having a small aperture 4' is interposed between the detector and the specimen such that a portion of the central maximum falls on the detector. When the device is operated, the mask is moved about until the detector reads the maximum signal at which time the mask aperture lies on the axis of symmetry of the diffraction pattern. The detector output is conveniently metered by a conventional read-out circuit. The mask can be positioned by hand or automatically, for example, by a servo mechanism actuated by the photodetector output. A second detector $D_2$ identical to detector $D_1$ is positioned generally as an angle $\theta_{D_2}$ with respect to the axis of symmetry of the diffraction pattern. A mask 5, integral with mask 4 and having an aperture 5' located at an angle of $\theta_{D_2}$ with respect to the axis of symmetry of the diffraction pattern, is interposed between detector $D_2$ and the specimen such that a portion of the diffraction pattern a distance from the axis of symmetry thereof is incident upon the detector through the mask aperture.

The ratio of the intensities read by the two detectors is expressed as:

$$\frac{I_{D_2}}{I_{D_1}} = \frac{\sin^2 \beta}{\beta^2}$$

wherein $I_{D2}$=intensity read by detector $D_2$,
$I_{D1}$=intensity read by detector $D_1$, and $$\beta = \frac{\pi W \sin \theta_{D_2}}{\lambda}$$

It is preferred to locate the apertuures 5' of mask 5 such that changes in the diffraction pattern induce dramatic changes in the ratio of intensities. For this purpose, it is preferred to locate the aperture such that $\sin \theta_{D2}$ is very nearly $\lambda/W$ (in which case $\beta$ is very nearly $\pi$).

To determine the unknown strain induced in the specimen, aperture 5' illuminating detector $D_2$ was located such that $\beta = 0.98\pi$, aperture 4' being located along the axis of symmetry N. The apertures are then fixed relative to the specimen and detectors. The ratio of intensities $I_{D_2}/I_{D_1}$ is read and found to be a value represented below as "I." After subjecting the specimen to an unknown tensile stress, W expands to a width equal to $W+\Delta W$. Letting $\epsilon$=strain ($=\Delta W/W$) and $\mu=1+\epsilon$, the value of $\beta$ after strain is a follows:

$$\beta' = \beta\mu$$

wherein $I_{D2}$=intensity read by detector $D_2$,
$I_{D1}$=intensity read by detector $D_1$, and The intensity ratio $I_{D_2}/I_{D_1}$, after strain is read and found to be a value represented below as I'.

The relation between the measured valued I' and I can be represented as:

$$\frac{I'}{I} = \frac{\dfrac{\sin^2 \beta'}{(\beta')^2}}{\dfrac{\sin^2 \beta}{\beta^2}} = \frac{\dfrac{\sin^2 \beta\mu}{(\beta\mu)^2}}{\dfrac{\sin^2 \beta}{\beta^2}} = \frac{1}{\mu^2} \frac{\sin^2 \beta\mu}{\sin^2 \beta}$$

In this case the ratio $I'/I$ of the measured intensity ratios, was 0.254 and $\mu$ is calculated as 1.01 which corresponds to a tensile strain of 0.01 or 1%. Thus a tensile strain of 0.01 caused the measured intensity ratio to vary by a factor of 4. Accordingly, the device has, for the chosen value of $\beta$, a gauge factor of 400 whereas the conventional bonded wire strain gauge has a gauge factor of about 2.

While in the foregoing embodiment, strain values were derived from intensity, and not angular, measurements, nevertheless the device does not suffer from the drawbacks mentioned above in connection with the Bell device because intensity ratio values, not intensity values, are involved in the calculations and any variations in background intensity, source intensity, etc., cancel out. Thus, the device illustrated is well suited to long-term, as well as short term, strain measurements.

Where $b$ is not very much greater than W, the diffraction pattern produced will be of the Fresnel type. The Fresnel pattern is symmetrical about an axis of symmetry and the intensities in this pattern can be equated, through known relationships, to the space W between the edges.

The wave source can be any source of electromagnetic radiation or sound waves. For measuring strain, visible light waves or infra red waves are preferred. The wave source may produce waves of substantially single frequency but this is not required since waves will diffract irrespective of this fact. It is preferred, however, that the wave source is a substantially single frequency source or that filters are used either at the source or at the detectors such that the foregoing simple relationships hold sufficiently true. It is therefore preferred that the bandwidth of the waves is small relative to the mean wavelength and a bandwidth variation of no more than 1% of wavelength is generally suitable although larger bandwidths, such as up to 10% of the wavelength, are tolerable. In any event, of course, the relationship between the ratio of intensity ratio measurements and strain for any given source can be determined by subjecting a specimen to known strains. Therefore, substantially any wave source can be used, but if the bandwidth of the waves is large, the device requires calibration or more involved calculations.

Beam splitter 3 shown in FIG. 1 is not required and the wave source may be positioned to direct waves directly towards the groove. In that case, the waves will be diffracted about an axis of symmetry which will be at an angle with respect to the normal specimen surface which angle will be equal to the angle of incident radiation with respect to the normal.

The waves are diffracted by being impinged at two points each on an edge of a member. Adjacent edges of two separate members may be used. Alternatively, the edges may be provided on a member such as by cutting or otherwise providing a depression in a member or by providing a raised portion on a member or by providing adjacent areas of sharply differing reflectivity on a surface of the member. Where areas of differing reflectivity are provided, the edges constitute the line of demarcation between the adjacent areas of differing reflectivity. Suitable edges may be provided on a member in a variety of ways. For example, a depression may be cut, etched, burned or otherwise provided in a surface and, if desired, the diffraction effect may be enhanced by either rendering the depression more reflective relative to the specimen or the surface area of the specimen made more reflective relative to the depression. Alternatively, a raised portion may be provided integral with the specimen or may be adhered thereto by welding, gluing, or otherwise adhering an element thereon. In this case, of course, the raised portion may be made more reflective than the adjacent specimen surface or vice versa to enhance the diffraction effect. The cross section of the depression or raised portion can vary widely. For example, the groove may be cut by a V-shaped tool or in channel form as shown in FIG. 1. However, where the impinging waves are reflected from the depression or raised portion, it is preferred that the reflecting surface is planar. The edges can be of any suitable shape, both linear and non linear. For detecting strain, it is preferred that the edges comprise two parallel linear edges for determining strain in one direction, rectangularly arranged edges for determining strain in two perpendicular directions, and edges arranged in the form of a regular hexagon or rosette for determining strain in three directions separated by 120°, or a circular edge for determining strain in any direction on the specimen surface.

Figure 2:
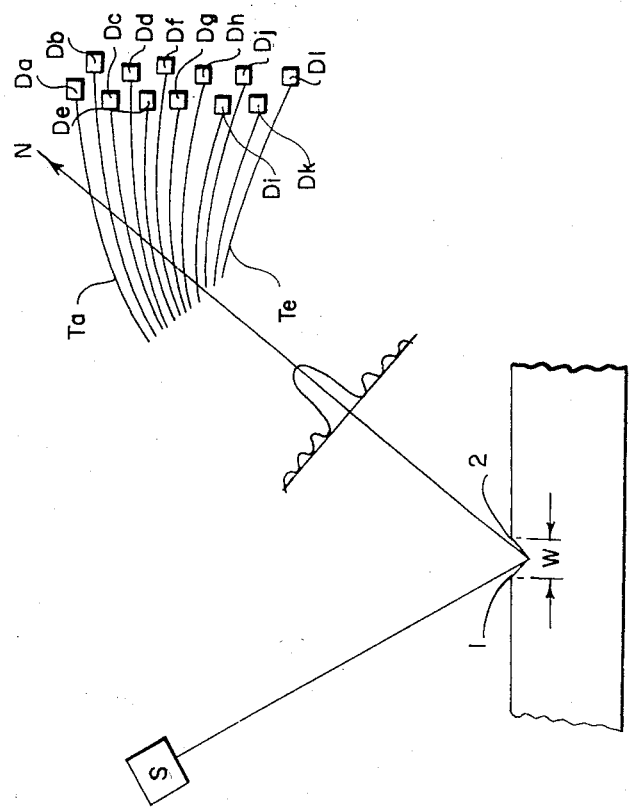
FIG. 2 is a diagrammatic view of a second embodiment of the invention showing a detector array.

The device shown in FIG. 2 illustrates an alternative detection scheme whereby the angular shift of a minima or secondary maxima is detected. Waves from the source S impinge upon the groove edges 1 and 2 producing a diffraction pattern of the single aperture type as depicted diagrammatically along a plane of observation. A plurality of fiber optic tubes $T_a$ through $T_l$, each associated wtih a photodetector $D_a$ through $D_l$, are provided with their ends disposed along the plane of observation to intercept a portion of the diffraction pattern with each end subtending a different angle $\theta$ with respect to the axis of symmetry N. At any given condition of strain, one of the tube ends $T_a$ through $T_l$ will detect the principal maximum and, in this example, a second tube end will detect a known minima which can be any of the known minima occurring in the pattern. Alternatively, a second tube end can be chosen to detect a known secondary maxima. The detector associated with each tube will thus detect the particular chosen portion of the pattern. In the case at hand, under no applied stress, the principal maximum is detected by $T_c$–$D_c$ and the first minima is detected at $T_f$–$D_f$. Under an unkown compressive stress the principal maxima is detected by $T_c$–$D_c$ and the first minima is detected at $T_g$–$D_g$. Using known relationships, the strain is calculated to be between 0.1 to 0.12%.

Figure 3:
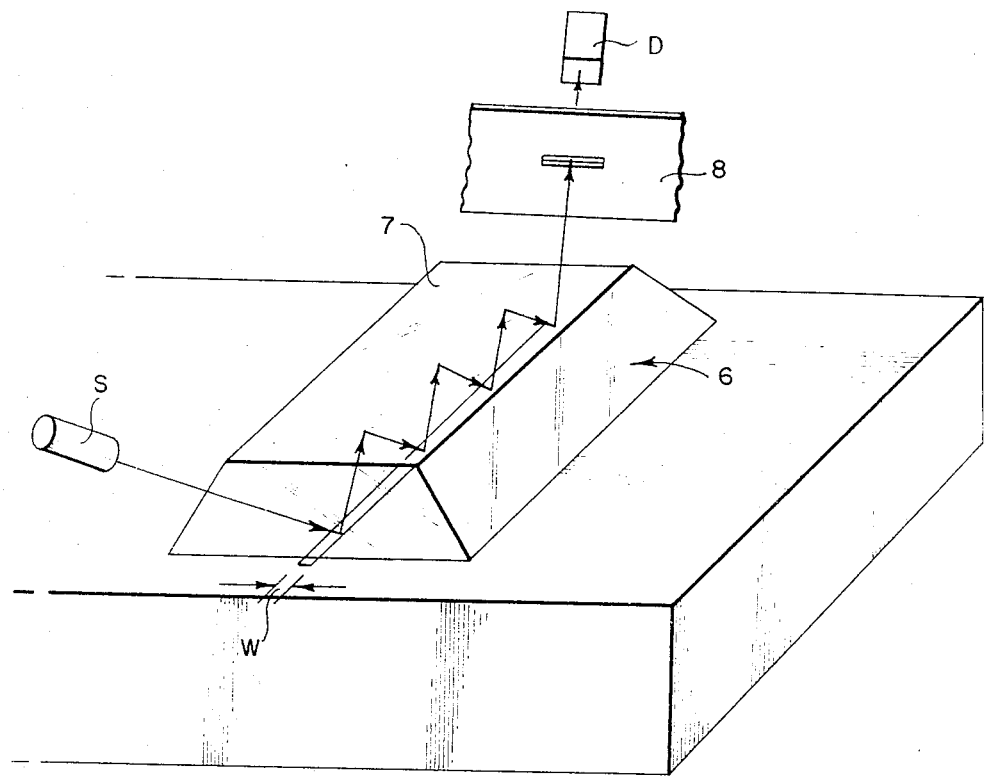
FIG. 3 is a diagrammatic view of a third embodiment of the invention showing the use of multiple diffractions to form a diffraction pattern.

In the device shown in FIG. 3, a specimen having a longitudinal groove having a width W is provided with a transparent block 6 which may be glass, plastic or the like, and which is fixed to the specimen in any suitable manner to prevent motion relative thereto. The upper surface 7 of the block 6 is reflecting and may be provided with a metallic coating, such as a silver coating, for this purpose. The wave source S is positioned to impinge upon the groove through the block 6 in the manner shown such that waves diffracted from the groove are reflected upon the mirrored surface 7 which, in turn, directs the waves back towards the groove a second time a distance down the groove, and so on. The angle of incidence, the length of the block and groove are chosen such that waves are impinged upon the groove a suitable number of times, in this case 4 times. After the first reflection, the usual diffraction pattern is produced. However, some of the waves making up the pattern are not impinged upon the mirror and further waves are lost in that not all of the waves reflected by the mirror are impinged upon the groove the second time, and so on. A detector is located in the path of the waves ultimately diffracted from the groove, in this case after the fourth diffraction. A mask 8 is interposed between the groove and the detector to present a portion of the ultimately diffracted pattern to the detector. A change in W is manifested in dramatic changes in the intensity of the waves passing through mask 8 due to the successive spreading, by diffraction, of the waves impinging upon the groove. The device is calibrated against known changes in W to provide a device useful for measuring unknown strains. Alternatively, unknown strains may be calculated for a given device. However, the calculations are involved and it is preferable to simply calibrate the device.

The mirror surface 7 may, of course, be curved to vary the amount of waves reflected to the groove. The source S and/or detector D are conveniently integral with the block 6 in which case a compact device is readily provided. While a block is preferred because of inherent structural rigidity, the block may be replaced by a hollow housing having a reflecting upper surface.

Figure 4:
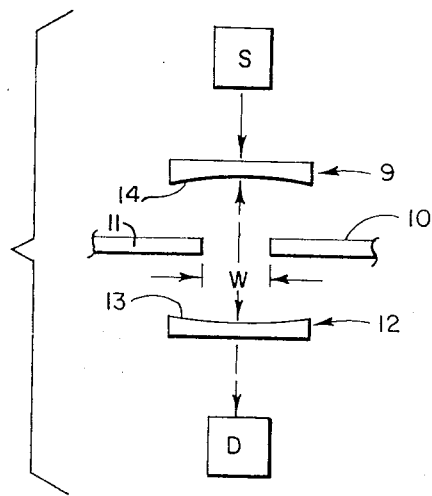
FIG. 4 is a diagrammatic view of a fourth embodiment of the invention.

In the device shown in FIG. 4, the space W between objects 10, 11, is measured by impinging waves from source S thereon. The waves, in this case electromagnetic radiation having a wavelength of about 2 millimeters, are directed at the space W through partially reflecting mirror 9 and the waves are diffracted towards partially reflective mirror 12 having a concave surface 13 which reflects some of the waves back towards the space W where the waves are again diffracted, this time towards mirror 9 having a concave reflecting surface 14. The waves continue to be reflected traversing the aperture after every reflection. A steady state condition is established at which time the emerging waves detected by detector D are in the form of one or more narrow beams. Under these circumstances, the incident waves traverse the aperture an infinite number of times. As in the case of the device shown in FIG. 3, the intensity of this emerging pattern, or any portion thereof, varies sharply with changes in W. Thus, changes in W can be easily detected and measurements can be made after calibration or calculation as in the case of the device of FIG. 3.

The mirrors shown in FIG. 4 can be flat or curved. The space W can be an aperture in a single object or it can be between adjacent objects shown. In either event, the diffraction pattern produced can be utilized to determine the aperture width since the pattern produced in these cases will be identical provided that W is identical. The source S can be mounted externally of the mirrors as shown or intermediate the mirrors.

Figure 5:
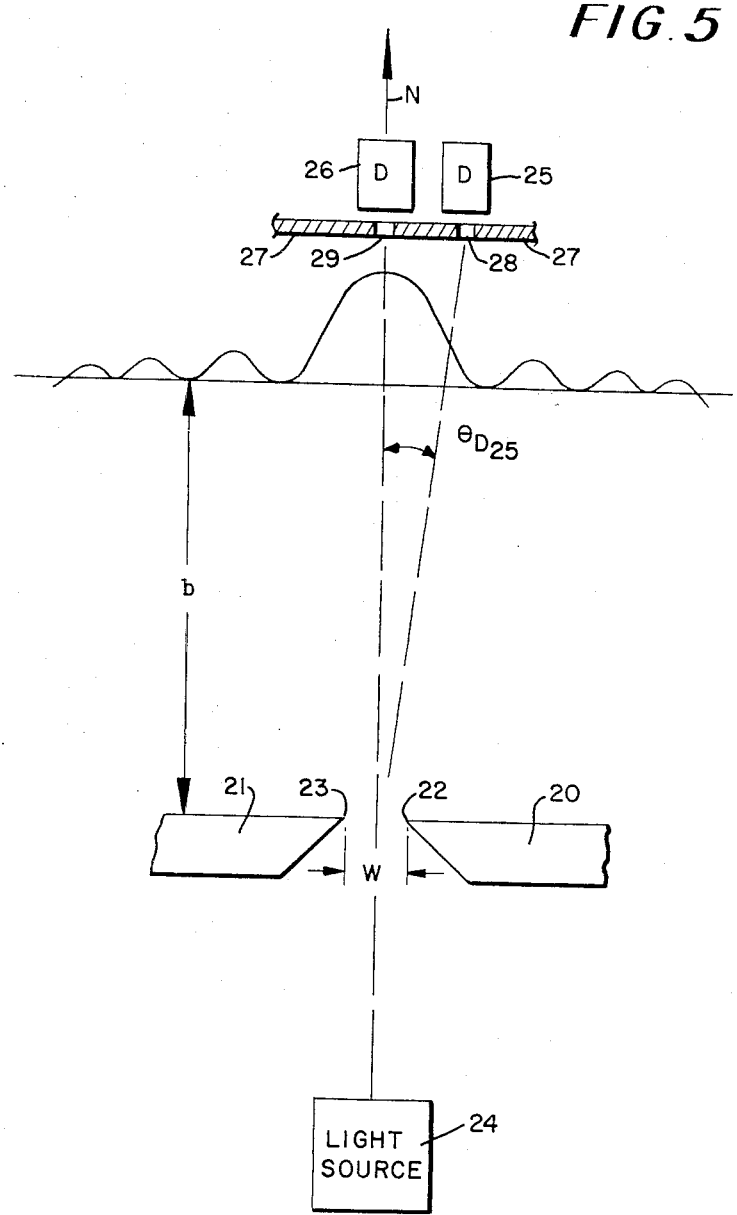
FIG. 5 is a diagrammatic view of an embodiment wherein a gap is provided between two separate members.

The embodiment illustrated in FIG. 5 is like that of FIG. 1 except that two members are used to form a slit aperture. Member 20 and member 21 are positioned such that points 22 and 23 form a gap having a width W between the members. A light source 24 of the type shown in FIG. 1 is located to direct its waves to impinge normal to the gap to produce a diffraction pattern of the single slit Fraunhofer type a distance $b$ from points 22 and 23, the pattern having the characteristics described in connection with the embodiment of FIG. 1. Photodetector 25 is positioned a fixed angle $\theta_{D_{25}}$ with respect to the axis of symmetry and is utilized to detect changes in intensity at that discrete portion of the diffraction pattern. An additional photodetector 26 and mask 27 having apertures 28 and 29 may be utilized as in the embodiment of FIG. 1. Other detector schemes, such as that of FIG. 2, can be used in lieu of that of FIG. 1 to monitor changes in the angular position of a discrete minima or secondary maxima of the pattern.

The wavelength of waves used in a particular embodiment depends on the edge separation W to be measured. In general it is undesirable that W is less than $\lambda$ or that W is very much greater than $\lambda$. Thus, in general, the average separation W is greater than $\lambda$ and less than $2000\lambda$. The particular wave source utilized depends on this desired wavelength and the type of wave desired. For example, where W is small, such as the width of a specimen scratch utilized for strain measurement, waves of light or near-infrared radiation would be suitable. However, for determining changes in the separation of two machine parts separated by a gap of 3 cm. millimeter (electromagnetic) waves would be suitable. Sound waves of 55 kc. traveling 1,100 ft./sec. in air (thus having $\lambda=0.6$ cm.) can also be used in this case. The wave detectors described are, of course, selected according to the type and wavelength of the source waves. For example, if light or near infrared electromagnetic waves are used, photoelectric devices such as photoconductive or photovoltaic diodes may be utilized if immediate and electrical readout response is desired. Photographic film, photochromic dyes and the like can be used when delayed results are suitable. Where longer wavelength electromagnetic waves are used, bolometers, thermopiles, and crystal detectors may be used. Acoustic waves can be detected by electromechanical microphones for long wavelengths or piezoelectric transducers where wavelengths are short.

Suitable readout systems for the disclosed detectors can be constructed in many ways. For instance, a photoconductive diode can be utilized to control the current flow in a circuit proportional to the intensity impinging upon its face. An ammeter sensing this current will thus provide readings proportional to the intensity and therefore to the space W. More sophisticated circuitry could be utilized to take the ratio of two detector outputs before and after strain as described in FIG. 1, or to interrogate each detector in the array of FIG. 2 in order to determine which detectors read a maximum or minimum. In similar fashion, a bolometer responds to electromagnetic radiation of light through microwave frequencies, as does a crystal for microwaves.

Acoustical detectors such as microphones convert sound pressure waves into signals such as currents induced by moving magnetic coils, or voltages created by piezoelectric quartz crystals. These electrical signals, like those of the electromagnetic radiation detectors, are also proportional to the intensity impinging on them.

The invention provides several advantages over the prior art. With respect to the prior invention of Bell and my own prior invention, the present invention provides a simpler method and device for measuring strain since it is a simple matter to provide a simple groove, for example, rather than to cut a diffraction grating on a specimen. The edges used to form the diffraction pattern can be quite closely spaced thus reducing the gauge size and allowing for a compact, miniature, device. In addition to an outstanding improvement in sensitivity, as measured by the gauge factor, the invention provides several distinct advantages over bonded wire gauges. For example, since the edges can constitute a part of the specimen itself, no "drift" or "zero shift" occurs with time thus rendering the instant device suitable for long term applications. Measurements may also be made in instances where bonded wire gauges would fail, for example under extremes of temperature, impact, etc.

As a separation measurement method, the disclosed invention offers high sensitivity. Since the object or objects constitutes the required edges, no modification or attachment of any kind need be made to the object. Furthermore, no physical contact with the object need be made, since only the waves themselves are used. High frequency changes in W can thus be measured, the speed being limited only by the detector response.

What is claimed is:

1. A method of determining a change in the separation of two points, each point being located on an individual member, said two points being separated by a gap between said members forming a slit aperture, the method comprising the steps of: directing waves from an electromagnetic waves source towards said two separated points to produce a single diffraction pattern of the single slit Fraunhofer type; measuring the intensity of a discrete portion of said single diffraction pattern, said discrete portion being located at a given angle with respect to the axis of symmetry of the pattern; redirecting said waves from said wave source at a later time towards said two separated points to produce a further single diffraction pattern of the single slit Fraunhofer type; measuring the intensity of a discrete portion of the further diffraction pattern, said discrete portion being located at said given angle with respect to the axis of symmetry of the pattern; comparing the two intensity measurements; and determining therefrom any difference in the separation of said pair of points at the time that said further single diffraction pattern was produced relative to the separation of said pair of points at the time that said single diffraction pattern was originally produced.

2. A method according to claim 1 wherein said gap is established by positioning said two members a distance apart.

3. A method of determining a change in the separation of two points, each point being located on an individual member, said two points being separated by a gap between said members forming a slit aperture, the method comprising the steps of: directing waves from an electromagnetic wave source towards said two separated points to produce a single diffraction pattern of the single slit Fraunhofer type; determining the angular position, relative to the axis of symmetry of the pattern, of a discrete portion of said single diffraction pattern, said discrete portion being selected from the group consisting of minima and secondary maxima; redirecting said waves from said wave source at a later time towards said two separated points to produce a further single diffraction pattern of the single slit type; determining the angular position of said discrete portion of the further diffraction pattern relative to its axis of symmetry; comparing the two angular positions, and determining therefrom any difference in the separation of said pair of points at the time that said further diffraction pattern was produced relative to the separation of said pair of points at the time that said single diffraction pattern was originally produced.

4. A method according to claim 3 wherein said gap is established by positioning said two members a distance apart.

5. A device for determining changes in the separation of two points, each point being located on an individual member and being separated by a gap between said members forming a slit aperture, said device comprising two members separated by a gap forming a slit aperture between said members, means for displacing one of said members relative to the other to change the gap width between said members, electromagnetic wave source means to direct waves towards two points, each of said two points being located on a different one of said two members, to produce a diffraction pattern of the single slit Fraunhofer type, and detector means for measuring the intensity of a discrete portion of said diffraction pattern, said discrete portion being located at a given, fixed, angle with respect to the axis of symmetry of the diffraction pattern.

6. A device for determining the changes in separation of two points, each point being located on an individual member and being separated by a gap between said members forming a slit aperture, said device comprising two members separated by a gap forming a slit aperture between said members, means for displacing one of said members relative to the other to change the gap width between said members, electromagnetic wave source means to direct waves towards said two points, each of said two points being located on a different one of said two members, to produce a diffraction pattern of the single slit Fraunhofer type, and detector means for monitoring changes in the angular position of a discrete minima or secondary maxima of said diffraction pattern.

7. A device according to claim 6 wherein said detector means comprises a plurality of discrete electromagnetic wave detectors positioned such that said diffraction pattern impinges thereon.

8. A device according to claim 7 wherein said detectors each comprise a fiber optic tube and photodetector, one end of said tube being positioned such that said diffraction pattern impinges thereon, and the other end thereof being adjacent said photodetector.

(References on following page)

References Cited

UNITED STATES PATENTS

| | | | |
|---|---|---|---|
| 2,183,459 | 12/1939 | Lehr et al. | 250—231 |
| 3,308,303 | 3/1967 | Weichselbaum et al. | 250—231 P |
| 3,518,007 | 6/1970 | Ito | 356—113 |
| 3,503,687 | 3/1970 | Venema | 356—106 |
| 2,929,242 | 3/1960 | Bell | 73—88 O |
| 3,184,961 | 5/1965 | Bell | 73—88 O |
| 3,458,257 | 7/1969 | Pryor | 356—32 |
| 3,462,223 | 8/1969 | Tieman et al. | 356—32 |

FOREIGN PATENTS

| | | | |
|---|---|---|---|
| 190,028 | 1967 | U.S.S.R. | 356—106 |

OTHER REFERENCES

Rigrod et al., Journal of Applied Physics, vol. 34, No. 4 (part 1), April 1963, pp. 967–968.

Bruce, Microtechnic, vol. 20, No. 2, May 1966, pp. 180-2.

Koedam, Philips Tech. Rev., vol. 27, pp. 208–210.

RONALD L. WIBERT, Primary Examiner

J. ROTHENBERG, Assistant Examiner

U.S. Cl. X.R.

73—88 O; 250—231; 350—162, 271, 272, 106